United States Patent
Dwivedi et al.

(10) Patent No.: US 8,817,722 B2
(45) Date of Patent: Aug. 26, 2014

(54) PREEMPTIVE DIRECT LINK CHANNEL SWITCHING

(75) Inventors: Ashwani Dwivedi, Hyderabad (IN); Shashidhar Shenoy, Hyderabad (IN); Sriman Miryala, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 389 days.

(21) Appl. No.: 13/275,869

(22) Filed: Oct. 18, 2011

(65) Prior Publication Data

US 2012/0314663 A1   Dec. 13, 2012

Related U.S. Application Data

(60) Provisional application No. 61/494,245, filed on Jun. 7, 2011.

(51) Int. Cl.
| | |
|---|---|
| *H04W 72/04* | (2009.01) |
| *H04W 36/00* | (2009.01) |
| *H04W 16/14* | (2009.01) |
| *H04W 76/04* | (2009.01) |
| *H04W 76/02* | (2009.01) |
| *G01S 7/02* | (2006.01) |

(52) U.S. Cl.
CPC .......... *H04W 36/0066* (2013.01); *H04W 16/14* (2013.01); *H04W 76/043* (2013.01); *H04W 76/023* (2013.01); *G01S 7/021* (2013.01)
USPC ............................ 370/329; 370/341; 370/348

(58) Field of Classification Search
USPC .......................................... 370/329, 341, 349
See application file for complete search history.

(56) References Cited

U.S. PATENT DOCUMENTS

| 7,251,235 | B2 | 7/2007 | Wentink | |
|---|---|---|---|---|
| 7,969,954 | B2 | 6/2011 | Abhishek et al. | |
| 2003/0177502 | A1* | 9/2003 | Kolze et al. | 725/111 |
| 2007/0104138 | A1 | 5/2007 | Rudolf et al. | |
| 2008/0075038 | A1 | 3/2008 | Jin et al. | |
| 2008/0273507 | A1* | 11/2008 | Sharma | 370/338 |
| 2009/0116400 | A1* | 5/2009 | Sekiya et al. | 370/252 |
| 2009/0310578 | A1 | 12/2009 | Convertino et al. | |
| 2010/0040007 | A1 | 2/2010 | Itagaki et al. | |

OTHER PUBLICATIONS

International Search Report and Written Opinion—PCT/US2012/040742—ISA/EPO—Sep. 28, 2012.

* cited by examiner

*Primary Examiner* — Dang Ton
*Assistant Examiner* — Pamit Kaur
(74) *Attorney, Agent, or Firm* — Hossain Beladi (57) ABSTRACT

A method includes receiving an instruction to cease transmission of frames over a first channel and receiving an indication of a second channel. The instruction and the indication are received at a first device from an access point device via the wireless network. The method includes establishing a direct link with a second device using the second channel.

37 Claims, 5 Drawing Sheets

PREEMPTIVE DIRECT LINK CHANNEL SWITCHING

I. CLAIM OF PRIORITY

The present application claims priority from U.S. Provisional Application No. 61/494,245 filed on Jun. 7, 2011, the contents of which are expressly incorporated herein by reference in their entirety.

II. FIELD

The present disclosure is generally related to wireless communication systems.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player.

Such devices may be configured to communicate data via a wireless network such as a wireless wide area network (WLAN). For example, many devices are configured to operate according to an Institute of Electrical and Electronics Engineers (IEEE) 802.11 specification that enables wireless exchange of multimedia data via an access point. However, when the access point designates that all devices in a basic service set (BSS) are to switch to another channel, such as when radar signal (or pulse) is detected on a current channel, the wireless exchange of multimedia data may be interrupted. For example, devices may have to comply with a non-transmission requirement following detection of an interference signal on the current channel that satisfies a radar signal detection criterion. In addition, the access point may introduce latency for the devices to switch to the new channel to provide additional time to notify devices that may be in a low power mode of the impending channel switch. Interruption of a data transmission on the current channel and the latency imposed by the access device prior to resuming the data transmission on the new channel may impact a quality of data delivery.

IV. SUMMARY

Systems and methods of preemptive direct link channel switching are disclosed. After receiving an indication of an upcoming channel switch from a first channel to a new channel, a first device may establish a direct link with a second device using the new channel before an access point device switches from the first channel to the new channel. Data transmission between the first device and the second device over the direct link avoids interruption in transmission due to a period of non-transmission on the first channel prior to the upcoming channel switch.

In a particular embodiment, a method includes receiving an instruction to cease transmission of frames over a first channel and receiving an indication of a second channel. The instruction and the indication are received at a first device over a wireless network from an access point device. The method also includes establishing, by the first device, a direct link with a second device using the second channel.

In a particular embodiment, a semiconductor device includes a direct link channel switch engine configured to request switching of a direct link from a first channel of a wireless network to a second channel after receiving an instruction to cease transmission of frames over a first channel and after receiving an indication of the second channel via the wireless network.

In another particular embodiment, the method includes receiving, at a first device within a basic services set (BSS), an instruction to cease communicating over a first channel and an indication of a second channel. The first device communicates with a second device over the first channel. The BSS includes an access point device and the instruction and the indication correspond to an access point-initiated channel switch to switch the BSS from the first channel to the second channel due to detection of an interference signal on the first channel that satisfies a radar signal detection criterion. The method includes determining whether the second device is within the BSS and in response to determining that the second device is within the BSS, establishing, by the first device, a direct link with the second device to enable communication between the first device and the second device that bypasses the access point device using the second channel. Establishing the direct link enables a quality of service (QOS) criterion for data exchange between the first device and the second device to be satisfied by avoiding a non-communication period on the first channel prior to completion of the access point-initiated channel switch.

In another embodiment, the semiconductor device includes a direct link channel switch engine configured to, in response to an instruction to cease communicating over a first channel and an indication of a second channel having been received from an access point device of a basic services set (BSS) and after a direct link with another device using the first channel has been established, determine whether the other device is within the BSS. The direct link with the other device enables communication with the other device using the first channel and bypassing the access point device. The instruction and the indication correspond to an access point-initiated channel switch to switch the BSS from the first channel to the second channel due to detection of an interference signal on the first channel that satisfies a radar signal detection criterion. The semiconductor device is configured, in response to determining that the other device is within the BSS, to request switching of the direct link from the first channel to the second channel to enable communication with the other device using the second channel and bypassing the access point device. Switching of the direct link to the second channel enables a quality of service (QOS) criterion for data exchange with the other device to be satisfied by avoiding a non-communication period on the first channel prior to completion of the access point-initiated channel switch.

The apparatus and methods disclosed enable switching of a data stream from a first channel to a second channel with reduced switching latency as compared to a channel switch procedure initiated by an access point. An interruption of a data stream during a non-transmission period may be avoided by preemptively switching to the second channel.

Other aspects, advantages, and features of the present disclosure will become apparent after review of the entire application, including the following sections: Brief Description of the Drawings, Detailed Description, and the Claims.

VI. DETAILED DESCRIPTION

Figure 1:
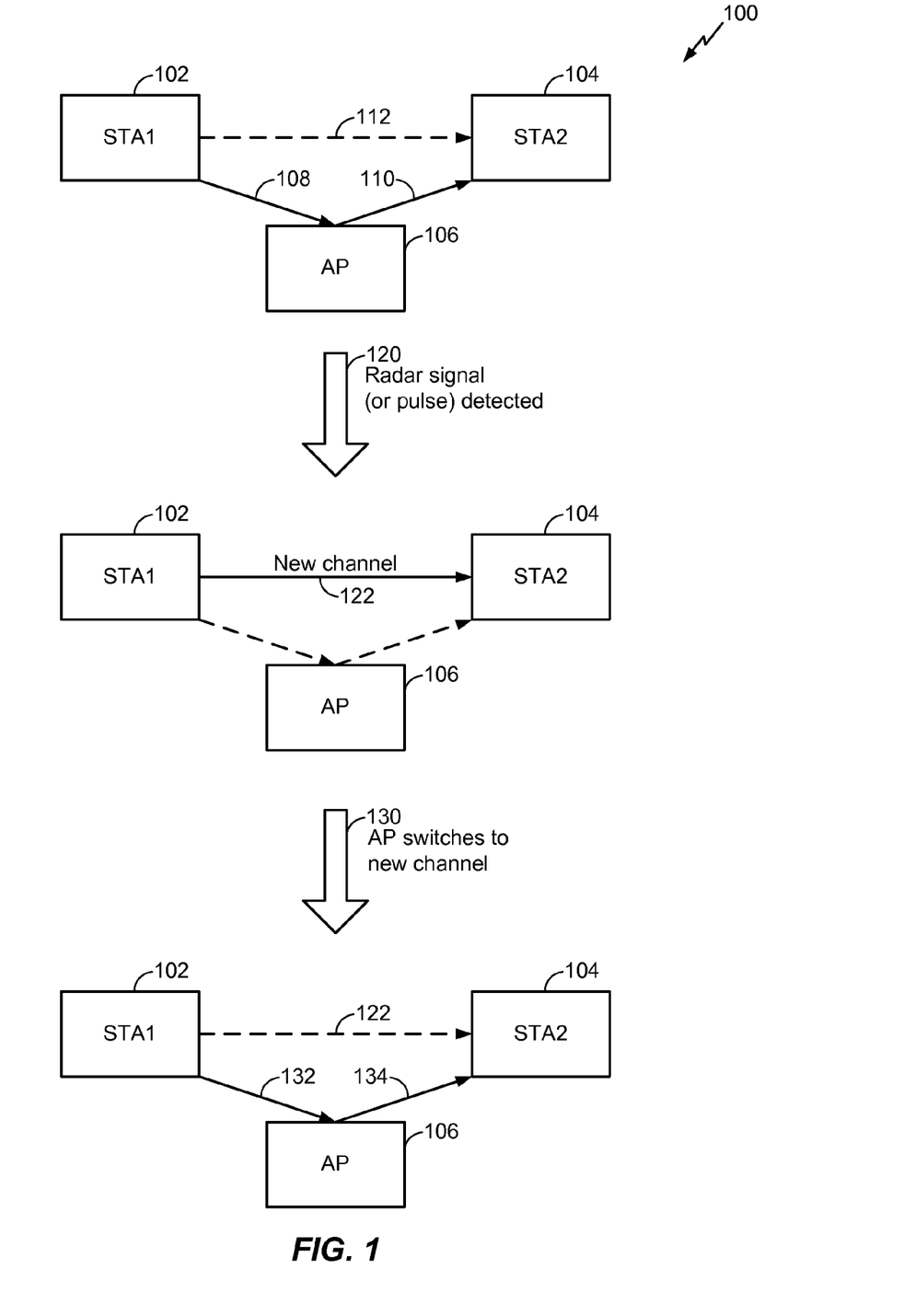
FIG. 1 is a block diagram of an illustrative embodiment of a communication system that includes a wireless device configured to perform preemptive direct link channel switching.

Referring to FIG. 1, a particular embodiment of a system that includes a device configured to perform preemptive direct link channel switching is depicted and generally designated 100. The system 100 includes a first device 102 in communication with a second device 104 via a wireless network. A third device 106 is an access point (AP) device of the wireless network.

For example, the system 100 may be implemented using a basic service set (BSS) according to an Institute of Electrical and Electronics Engineers (IEEE) 802.11 specification that is configured to use a range of frequencies around five gigahertz (GHz) or higher, such as an IEEE 802.11n specification. The first mobile device 102 may be a first station (STA1) having access to the wireless network and the second device 104 may be a second station (STA2) having access to the wireless network.

In a particular embodiment, the access point device 106 may designate a first channel for communication of the first device 102 and the second device 104 via the access point device 106. As illustrated, the first device 102 is configured to wirelessly communicate data to the second station 104 via a first link 108 between the first device 102 and the access point device 106 and a second link 110 between the access point device 106 and the second device 104. Alternatively, the first device 102 and the second device 104 may communicate via a direct link 112 where data is transmitted from the first device 102 to the second device 104 without the access point device 106 relaying or routing the data.

The wireless network may be configured to use one or more frequencies that may also be used by radar systems for transmission of radar signals, such as frequencies in a 5-6 GHz range. For example, the devices 102, 104, and 106 may communicate via a first channel. A radar signal (or pulse) may be detected as an interference signal being transmitted over the first channel, at 120. For example, the first device 102 may be configured to perform channel measurement and may detect whether an interference signal on the first channel exceeds a radar signal interference threshold. In a particular embodiment, the radar signal interference threshold may correspond to a received signal strength of −62 dBm (i.e. −62 decibel (dB) referenced to one milliwatt (mW)). Alternatively, the access point device 106 may be configured to perform channel measurement or to direct one of the other devices 102, 104 to perform channel measurement and provide results to the access point device 106 for radar signal detection analysis by the access point device 106.

In response to detecting that the interference signal in the first channel exceeds the radar signal interference threshold, the access point device 106 selects a second channel for future communication of the wireless network. The access point device 106 may be configured to comply with regulations requiring that a wireless communication network change a communication frequency in response to detecting co-usage of the frequency by one or more radar systems. The access point device 106 may communicate information indicating the second channel to the first device 102 and to the second device 104. In addition, the access point device 106 may instruct the devices 102, 104 to cease transmission of frame data on the first channel and may indicate a channel switch time to synchronize switching between the first channel and the second channel.

The channel switch time may occur after a predetermined interval has expired. For example, the access point device 106 may set the interval period so that mobile devices that may be in a low power mode may awaken from the low power mode in sufficient time to receive a notice of the channel change. By selecting a long interval for the channel change, devices that are in low power mode when the access point device 106 selects the second channel for future communication have a greater likelihood of receiving the notice of channel change prior to the channel switch, thus avoiding such devices being dropped from the network during or after the channel switch.

Prior to the access point device 106 changing wireless communication of the network from the first channel to the second channel, the first device 102 may initiate communication with the second device 104 using the new channel (i.e. the second channel). For example, the first device 102 may initiate a direct link with the second device 104 using the second channel prior to the access point device 106 switching the network over to the second channel. As a result, the first device 102 and the second device 104 may continue transmission of data during a time period after the access point device 106 has instructed the devices 102, 104 to cease frame transmission on the first channel but prior to the access point device 106 initiating a switch to the second channel. Data transfer between the first device 102 and the second device 104 may therefore continue substantially uninterrupted by using the direct link 122 on the new channel.

At a subsequent time, the access point device 106 switches the wireless network to the new channel, at 130. The first device 102 and the second device 104 may continue communication via the direct link 122. Alternatively, the first device 102 and the second device 104 may tear down the direct link 122 and may instead communicate over the second channel via a first link 132 between the first device 102 and the access point device 106 and a second link 134 between the access point device 106 and the second device 104.

By preemptively establishing the direct link 122 between the first device 102 and the second device 104 using the new channel (i.e. prior to a frame transmission blackout (i.e. non-transmission) period that precedes the channel switch of the access point device 106 to the new channel), data transmissions between the first device 102 and the second device 104 may maintain a requested quality of service (QOS). For example, the second device 104 may be a television and the first device 102 may be a mobile phone or camera streaming multimedia data that has a specified transfer rate for uninterrupted playback. Because the access point device 106 may instruct an immediate cease of frame transmission and may attempt to delay switching the channel until all, or at least most, wireless devices using the wireless network and that may be in a power saving mode are expected to awaken and receive the channel switch information, the delay before switching to the new channel may be significant (e.g. a ten second delay is possible). Preemptive direct link channel switching initiated by the first device 102 enables data transfer to the second device 104 to continue via the new channel and may enable a requested QOS of the data transfer to be satisfied.

Figure 2:
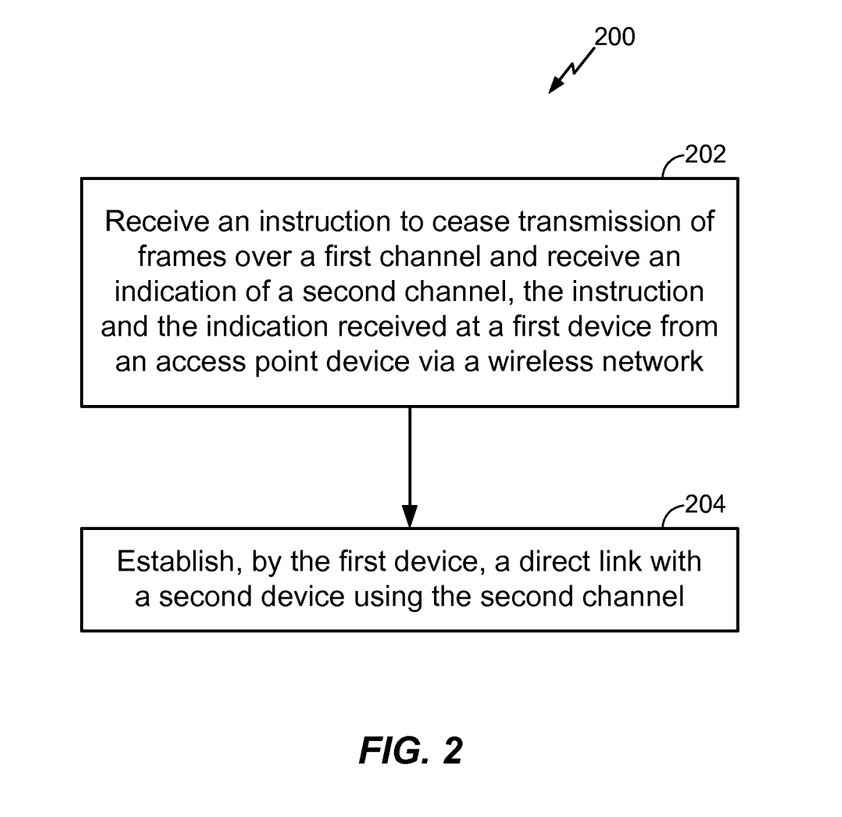
FIG. 2 is a flow diagram of a first illustrative embodiment of a method of preemptive direct link channel switching.

Referring to FIG. 2, a flow chart of a method of preemptive direct link channel switching is depicted and generally designated 200. The method 200 includes receiving an instruction to cease communication (e.g. an instruction to cease transmission of frames) over a first channel and receiving an indication of a second channel, at 202. The instruction and the indication are received at a first device via a wireless network. For example, the first device 102 may receive the instruction and the indication from the access point 106 via the wireless network.

A direct link is established by the first device with a second device using the second channel, at 204. For example, the direct link may be the direct link 122 of FIG. 2 that is established between the first device 102 and the second device 104 of FIG. 2. By establishing the direct link with the second device using the second channel, a delay time between ceasing communication (e.g. ceasing transmission of frames) on the first channel and the access point device switching transmission of the wireless network to the second channel may be reduced or largely avoided.

Figure 3:
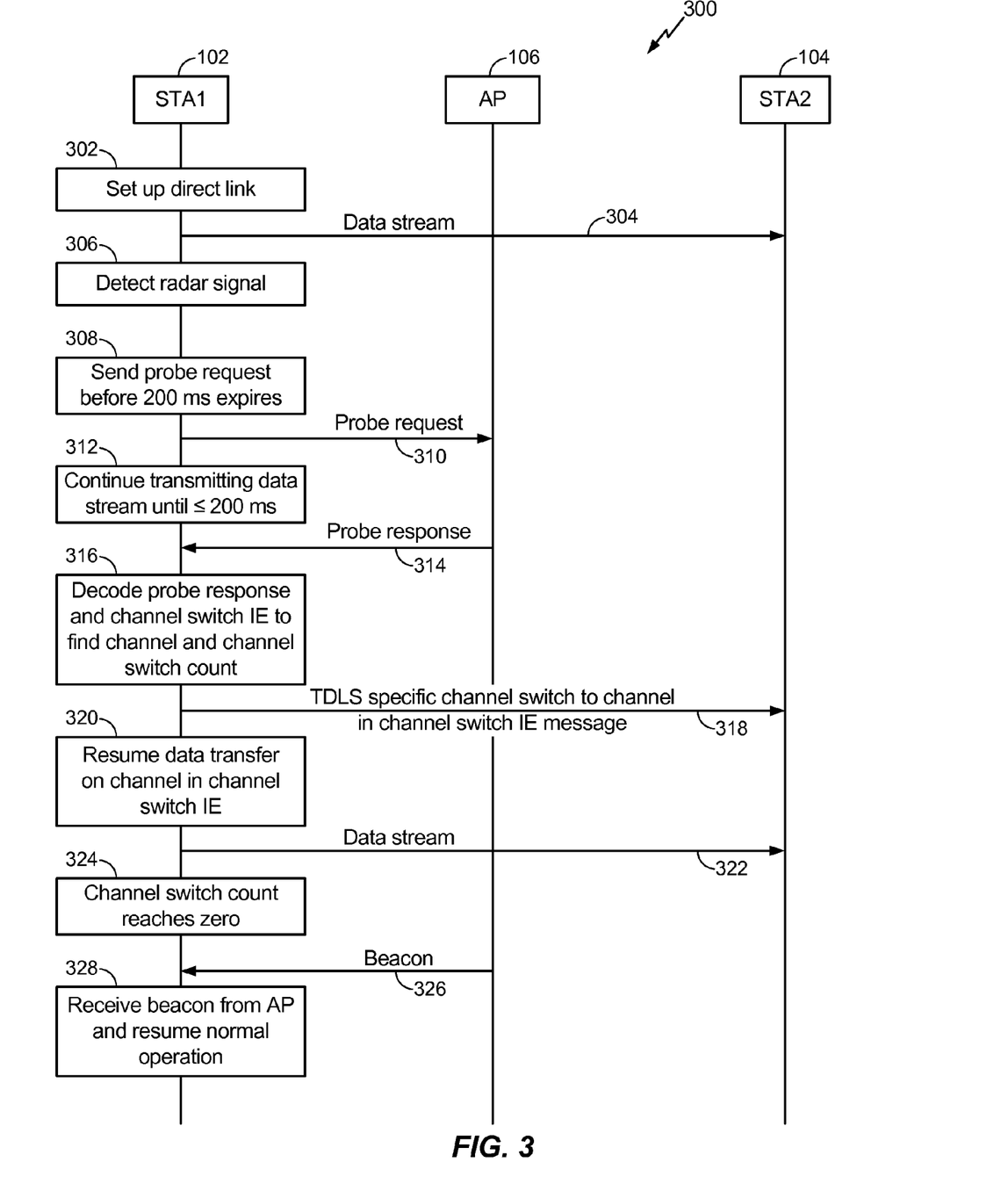
FIG. 3 is a general diagram of a second illustrative embodiment of a method of preemptive direct link channel switching.

Referring to FIG. 3, a diagram 300 is illustrated showing actions and signaling of the first device 102, the access point device 106, and the second device 104 of FIG. 1 according to a particular embodiment. A direct link is set up by the first device 102, at 302. The direct link 302 is set up between the first device 102 and the second device 104 and enables a data stream 304 to be transmitted directly from the first device 102 to the second device 104 via a first channel.

After setting up the direct link for the data stream 304, the first device 102 may detect that an interference signal on the first channel on which the direct link 302 is established satisfies a radar signal (or pulse) detection criterion, at 306. The first device 102 may be configured to cease transmission on a channel within a predetermined time period after detecting that the radar signal (or pulse) detection criterion is satisfied, such as after 200 milliseconds (ms). For example, the radar signal (or pulse) detection criterion may correspond to one or more signal characteristics, such as signal strength, pulse width, or pulse repetition frequency, that are associated with one or more types of radar signals (e.g. radar signals that are used by civilian navigation or maritime radar systems, weather radar systems, or military radar systems). In response to detecting that the radar signal detection criterion is satisfied, the first device 102 may send a probe request 310 to the access point device 106 before the 200 ms time period expires, at 308. After sending the probe request 310, the first device 102 may continue transmitting the data stream on the first channel until the expiration of the 200 ms transmission time period, at 312.

The access point device 106 receives the probe request 310 and sends a probe response 314 to the first device 102 in response to the probe request 310. The access point device 106 inserts a channel switch information element (IE) in the probe response 314 in response to determining that interference on the first channel corresponds to a radar signal (or pulse) detection criterion. The channel switch IE includes an indication of a second channel and also indicates a channel switch count. The channel switch count may include a count of a number of beacons that will be transmitted by the access point device 106 before switching to the second channel.

The first device 102 decodes the probe response 314 and the channel switching IE to detect the indication of the second channel and the channel switch count, at 316. Upon receiving the channel information, the first device 102 sends a channel switch instruction to the channel (i.e. the second channel) indicated in the channel switch IE message to the second device 104, at 318. To illustrate, the first device 102 may use a tunneled direct link setup (TDLS) message protocol that enables signaling information to be transmitted from the first device 102 to the second device 104 via the direct link and bypassing the access point device 106. In TDLS, signaling frames can be encapsulated in data frames, enabling the signaling frames to be transmitted through an access point transparently. Therefore, the access point does not need to be direct link aware, nor does the access point have to support any of the capabilities used on the direct link. TDLS can also include an option either to enter Peer Power Save Mode (Peer PSM) while remaining on the direct link or to suspend receiving over the direct link, so that a station can enter a power save mode. TDLS may enable "off channel" operation to achieve a channel switch of the first device 102 and the second device 104 to another channel while remaining connected to the access point device 106 on a base channel. A TDLS channel switch can be transparent to user applications at the first device 102 and the second device 104.

After sending the channel switch instruction to the second device 104, resumption of data transfer on the channel indicated in the channel switch IE occurs, at 320, and a data stream 322 is transmitted on the direct link between the first device 102 and the second device 104 on the indicated channel (i.e. the second channel).

The first device 102 monitors beacons from the access point device 106 by periodically listening for the beacons and decrements a channel switch count in response to each detected beacon. When the channel switch count reaches zero, at 324, the first device 102 listens for the beacon 326 on the second channel. After receiving beacon 326 on the second channel, normal operation at the first device 102 resumes, at 328.

For example, upon receiving the beacon 326 from the access point device 106, the first device 102 may initiate a direct link channel teardown to tear down the direct link between the first device 102 and the second device 104 on the second channel and may continue transmitting the data stream 322 using the access point device 106 as an intermediary device. Alternatively, the direct link may be maintained on the second channel after the access point device 106 has transitioned to the second channel.

By detecting that the radar signal (or pulse) detection criterion is satisfied and sending the probe request 310, the first device 102 may expedite receipt of the channel switch information including the new channel designation from the access point device 106. The access point device 106 may be required to send the channel switch information in the probe response 314 at a time earlier than the access point device 106 may otherwise have broadcast the channel switch information to devices over the wireless network. By receiving the channel switch information in the probe response 314, the first device 102 may effectively use the portion of time remaining of the 200 ms period to switch communication to the second channel using the direct link with the second device 104.

Although FIG. 3 illustrates the direct link setup 302 and the data stream 304 occurring prior to detecting that an interference signal on the first channel satisfies a radar signal (or pulse) detection criterion at 306, in other embodiments the first device 102 may establish the direct link and begin the data stream in response to detecting that the interference signal on the first channel satisfies the radar signal (or pulse) detection criterion. For example, the first device 102 may detect that an interference signal on the first channel satisfies a radar signal (or pulse) detection criterion, and in response to the detection, the first device 102 may set up a direct link and send the probe request 310. The direct link is set up using the first channel and switches via a TDLS channel switch to the second channel prior to the expiration of the 200 ms period.

Although FIG. 3 illustrates a single data stream 304 between the first device 102 and the second device 104, in other embodiments multiple data streams may be communicated between various devices. For example, multiple data streams may be communicated between the first device 102 and the second device 104, and a data stream with a highest quality of service requirement or a highest priority may be selected to be the first data stream to be switched over to the second channel in response to a channel change event, such as due to a detected radar signal. After preemptively switching the direct link channel of a highest quality service or data stream to the second channel, the first device 102 may continue with establishing and/or the preemptively switching other direct link channels for lower priority data streams, until all data streams have been preemptively switched or until the 200 ms time period expires and the first device 102 is prevented from further transmissions on the first channel. Alternatively, or in addition, the first device 102 may send one or more data streams to one or more additional devices (not shown) and may select a data stream having a highest QOS or priority among all of the data streams of the first device 102 for preemptive direct link channel switching.

In an illustrative embodiment, the first channel may be in a 5 GHz band of frequencies. Regulations may apply to the 5 GHz band that require devices operating in the 5 GHz band to implement a mechanism to avoid co-channel operation with radar systems and to encourage uniform utilization of available channels. The access point device 106 may implement such a mechanism, such as a dynamic frequency selection (DFS) mechanism in accordance with an IEEE 802.11 specification.

A DFS service can provide for the following:

Association of stations (STAs) with an access point (AP) in a basic service set (BSS) based on the STAs' supported channels.

Quieting the current channel so the current channel can be tested for the presence of a radar signal with less interference from other STAs.

Testing channels for the presence of a radar signal before using a channel and while operating in a channel.

Discontinuing operations after detecting a radar signal in the current channel to avoid interference with radar.

Detecting a radar signal in the current channel and other channels based on regulatory requirements.

Requesting and reporting of measurements in the current channel and other channels.

Selecting and advertising a new channel to assist the migration of a BSS or independent BSS (IBSS) after a radar signal is detected.

Once a radar signal is detected at an AP, at a STA, or a channel switch is received by any STA, the AP may broadcast a channel switch announcement to all associated STAs to switch to the target channel.

On 5 GHZ DFS sensitive channels, a wireless local area network (WLAN) station may switch to a different channel as directed by an access point (AP) after the access point detects a radar signal on the given channel. There may be nondeterministic latencies involved at the station between a first time when the access point detects the radar signal and a second time when the access point completes channel switching. For example, to accommodate stations that may be in an aggressive power save mode (i.e. not receiving data), channel switching by the access point may take more than 10 beacon intervals for completion.

If a radar signal is detected on a given channel for a BSS (i.e. an interference signal that satisfies one or more radar signal (or pulse) detection criteria is detected on the channel), the following procedure may be performed to improve or ensure QOS for data exchange between stations within the BSS by avoiding interruption during the access point channel switch latency.

1) Determine whether the current channel is DFS sensitive.

2) Determine whether a QOS data stream is established between station S1 and station S2 (where S1 and S2 are within the BSS). For example, a DLS (TDLS) based discovery procedure or another procedure may be performed to determine whether a given station is within the BSS.

3) Enable a DLS (TDLS) link between the stations S1 and S2 before a data stream is started between the stations S1 and S2. If S1 is streaming with one or more other stations (e.g. S3, S4, or S5) over different QOS streams, preference may be given to a station that has highest priority traffic.

4) If a radar signal is detected on the given channel and the QOS data stream is in progress between stations within the BSS, the transmitting station may be required to stop transmitting any data to another station after 200-250 ms after the radar signal is detected, according to an IEEE 802.11h specification.

5) A determination may be made at a time T1 whether the data stream has already started, where Tradar<T1<200 ms and where Tradar is the time when the radar signal is detected.

6) If the data stream has already started from station S1 to station S2, station S1 (or station S2) will send a probe request frame to the access point and receive a probe response from the access point after a time T2 (T2<200 ms).

7) Station S1 (or station S2), will decode the probe response frame to find a channel switch IE within the probe response. For example, station S1 (or station S2) may expect that the access point is also able to detect the radar signal and is preparing for a channel switch.

8) Station S1 (or station S2) may receive a spectrum management action frame or beacon with a channel switch element IE (within time T2).

9) If one or more of station S1 and station S2 are in a power save mode, the station may be performing unscheduled automatic power save delivery (U-APSD) of the data stream.

10) If one or more of station S1 and station S2 is in the power save mode, the station may receive a spectrum management action frame or beacon with a channel switch IE within a time that is less than T2.

11) After the sequence described in steps 6-10, above, is performed, station S1 (or station S2) will not enter into a power save mode to suspend communication with the access point. For example, a station may enter into a power save mode before a TDLS-enabled channel switch operation to maintain a connection with an access point. In a power save mode, data to be transmitted to the station may be buffered and may be sent to the station at a later time after the station exits from the power save mode. However, because there will not be any data from any station within the BSS or from the access point because of the transmission restriction due to radar detection, entry into power save mode with the access point is not required.

12) Station S1 (or station S2) will select the channel specified in channel switch IE and issue a channel switch instruction to the peer station. For example, station 1 may send a TDLS specific channel switch request to switch the TDLS link to an "off channel" (i.e. to the channel specified in the channel switch IE).

13) Stations S1 and S2 may exchange data on this off channel using the TDLS direct link until a channel switch count becomes less than or equal to zero.

14) Stations S1 and S2 may resume data exchange on an access point link (e.g. via links 132 and 134 of FIG. 1) once stations S1 and S2 receive beacons of the access point after the channel switch count is less then or equal to zero.

Performance of the sequence described in steps 1-14, above may ensure a requested QOS is achieved for the data stream of the station S1 with the highest QOS requirement. In addition, performance of the sequence described in steps 1-14 may improve a deterministic behavior for data requiring a higher QOS on a DFS sensitive 5 GHz band channel.

A total latency for the data stream to switch to the off channel (i.e. the channel specified in the channel switch IE) and continue data exchanges via direct link using the off channel may be approximately 7-10 ms. For example, a channel switch latency within a WLAN network may be approximately 3-5 ms. A latency involved in channel access/medium busy on the off channel may be approximately 2 ms. Other processing latencies may be approximately 2-3 ms, resulting in a total latency of approximately 7-10 ms.

Figure 4:
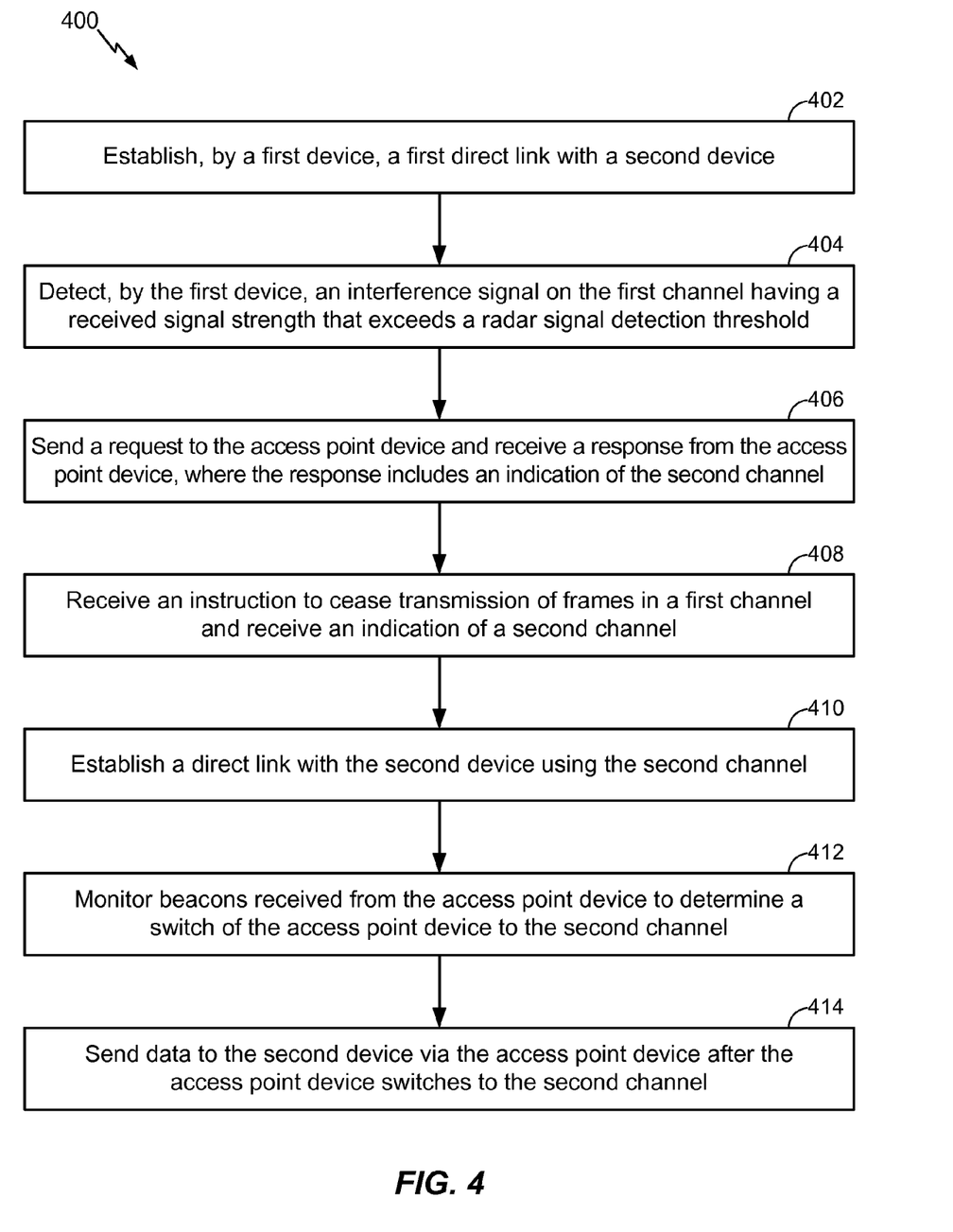
FIG. 4 is a flow diagram of a third illustrative embodiment of a method of preemptive direct link channel switching.

Referring to FIG. 4, a particular method of preemptive direct link channel switching is depicted and designated 400. The method 400 may be performed by a device communication over a wireless network, such as the first device 102 of FIG. 1. In an illustrative embodiment, the method 400 corresponds to operations performed by the first device 102 according to the diagram 300 of FIG. 3.

A first direct link with a second device is established by a first device, at 402. The first direct link may use a first channel. For example, the first direct link may correspond to the direct link for the data stream 304 of FIG. 3. An interference signal on the first channel having a received signal strength that exceeds a radar signal (or pulse) interference threshold is detected by the first device, at 404.

A request may be sent by the first device to the access point device and a response received at the first device from the access point device, at 406. The request may be sent in response to detecting that the interference signal exceeds the radar signal (or pulse) interference threshold. The response includes the indication of a second channel. For example, the request may include the probe request 310 of FIG. 3 and the response may include the probe response 314 of FIG. 3. The response includes a channel switch announcement and may also include an instruction to cease transmission of frames over the first channel. For example, the instruction may correspond to a channel switch mode indicator in the channel switch announcement. To illustrate, the channel switch mode announcement may include a designated field with a value that indicates a channel switch mode in accordance with an IEEE 802.11h specification. A "0" value in the channel switch mode field may indicate no restrictions on a station receiving the announcement and a "1" value in the channel switch mode field may indicate that the receiving station should transmit no further frames until the scheduled channel switch.

An instruction to cease transmission of frames in the first channel and an indication of a second channel may be received, at 408. An access point device of the wireless network, such as the access point device 106, may send the instruction and the indication of the second channel via one or more transmissions, such as beacons, in addition to the probe response. The indication of the second channel and the instruction to cease transmission of frames may correspond to the detection by the access point device that the interference signal on the first channel exceeds the radar signal (or pulse) interference threshold.

The first device establishes a direct link with a second device using the second channel, at 410. For example, establishing the direct link with the second device using the second channel may include sending a channel switch instruction to the second device via a first direct link using the first channel. The direct link may be established using the second channel prior to the access point device switching to the second channel. In a particular embodiment, the channel switch instruction is sent according to a tunneling direct link setup (TDLS) procedure.

Beacons received from the access point device are monitored to determine a switch of the access point device to the second channel, at 412. For example, the access point device may schedule a switch to the second channel by designating a count of beacons to be broadcast by the access point device. After the designated number of beacons have been sent by the access point device, the channel switch may be effected.

Data is sent to the second device via the access point device after the access point device switches to the second channel, at 414. For example, with reference to FIG. 1, the direct link 122 may be torn down and the first device 102 may communicate with the second device 104 via the first link 132 and the second link 134.

Although the method 400 describes that the first direct link with the second device may be established prior to detecting that the interference signal on the first channel exceeds the radar signal (or pulse) interference threshold, at 402, in other embodiments the first direct link may be established with the second device in response to detecting that the interference signal on the first channel exceeds the radar signal (or pulse) interference threshold. For example, the first device 102 may set up the first direct link with the second device 104 after detecting that the interference signal on the first channel exceeds the radar signal (or pulse) interference threshold. Although the method 400 describes that data is sent to the second device via the access point device after the access point device switches to the second channel, at 414, in other embodiments the direct link may be maintained for communication between the first device and the second device.

Figure 5:
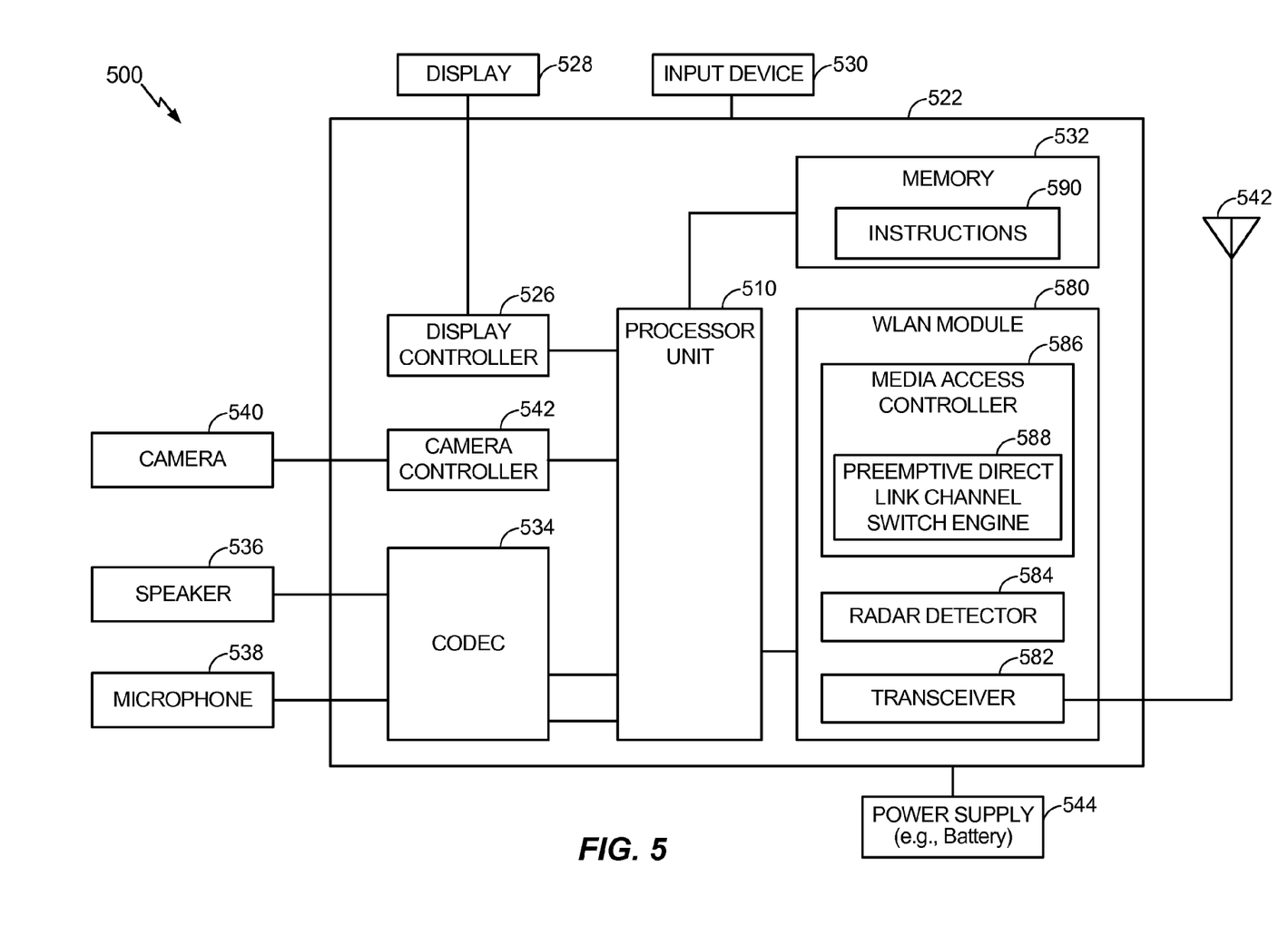
FIG. 5 is a diagram of a wireless device configured to perform preemptive direct link channel switching.

Referring to FIG. 5, a block diagram of a particular illustrative embodiment of an electronic device is depicted and generally designated 500. The device 500 includes a processing unit 510, such as one or more general purpose processors, one or more digital signal processors (DSP), one or more other hardware processors, or any combination thereof, coupled to a memory 532. A wireless local area network (WLAN) module 580 is coupled to the processor unit 510 and is configured to enable the device 500 to preemptively switch a direct link to a second channel. In a particular embodiment, the device 500 may be the device 102 of FIG. 1 or may operate as described with respect to one or more of FIG. 3-5.

The WLAN module 580 may be a semiconductor device that includes a wireless transceiver 582, a radar detector 584, and a media access controller (MAC) 586. The MAC 586 includes a preemptive direct link channel switch engine 588. The preemptive direct link channel switch engine 588 may be configured to switch a direct link between the device 500 and another device having access to a WLAN as described with respect to FIG. 3. For example, the preemptive direct link channel switch engine may be configured to initiate a probe request to an access point via an antenna 542, receive a probe response indicating a channel switch target channel, and communicate via a tunneling direct link setup (TDLS) protocol a channel switch between the device 500 and the other device in expectation of the access point transitioning the wireless network (e.g. a BSS) to the new channel.

The radar detector 584 may be configured to perform channel measurements in response to the MAC 586 or in response to an instruction from an access point device such as the access point device 106 of FIG. 1. The radar detector 584 may further be configured to analyze results of the channel measurements to determine whether the results of the channel measurements satisfy one or more radar signal (or pulse) detection criteria.

In a particular embodiment, the radar detector 584 and/or the MAC 586 may be implemented as dedicated circuitry. In other embodiments, at least one of the radar detector 584 and the MAC 586 may be implemented as processor-readable code executed by a processor, such as at a DSP at the processing unit 510 or at a processor within the WLAN module 580. The processor-readable code may be stored as computer executable instructions at a non-transitory computer readable tangible medium, such as instructions 590 stored in the memory 532 or at another memory integrated in or accessible to the WLAN module 580.

FIG. 5 also shows a display controller 526 that is coupled to the processing unit 510 and to a display 528. A coder/decoder (CODEC) 534 can also be coupled to the processing unit 510. A speaker 536 and a microphone 538 can be coupled to the CODEC 534. A camera 540 is coupled to a camera controller 542 that is coupled to the processing unit 542.

FIG. 5 also indicates that the WLAN module 580 can be coupled to the processing unit 510 and to the wireless antenna 542. In a particular embodiment, the processing unit 510, the display controller 526, the memory 532, the camera controller 542, the CODEC 534, and the WLAN module 580 are included in a system-in-package or system-on-chip device 522. In a particular embodiment, an input device 530 and a power supply 544 are coupled to the system-on-chip device 522. Moreover, in a particular embodiment, as illustrated in FIG. 5, the display 528, the input device 530, the speaker 536, the microphone 538, the wireless antenna 542, the camera 540, and the power supply 544 are external to the system-on-chip device 522. However, each of the display 528, the input device 530, the speaker 536, the microphone 538, the wireless antenna 542, the camera 540, and the power supply 544 can be coupled to a component of the system-on-chip device 522, such as an interface or a controller.

In conjunction with the systems of FIGS. 1 and 5 and the methods of FIGS. 2-4, systems, devices, and methods of preemptive channel switching are disclosed. For example, a system may include an access point device configured to send, via a wireless network, an instruction to cease transmission of frames in a first channel and an indication of a second channel. The system can also include a first device in the wireless network configured to receive the instruction and the indication and to establish a direct link with a second device using the second channel. To illustrate, the system 100 of FIG. 1 includes the access point device 106 and the first device 102.

As another example, a method may be performed that includes sending, by an access point device, an instruction to cease transmission of frames in a first channel and an indication of a second channel via a wireless network. The method may also include receiving, by a first device, the instruction and the indication, and establishing, by the first device, a direct link with a second device using the second channel. For example, the method may be performed using the system 100 of FIG. 1.

As another example, an apparatus may include means for receiving an instruction to cease transmission of frames over a first channel and receiving an indication of a second channel. For example, the means for receiving the instruction and the indication may include the transceiver 582 of the WLAN module 580 of FIG. 5. The instruction and the indication are received from an access point device via a wireless network. The apparatus may also include means for establishing a direct link with a second device using the second channel. For example, the means for establishing may include the preemptive direct link channel switch engine 588 of the WLAN module 580 of FIG. 5 implemented as dedicated circuitry. As another example, the means for establishing may include the preemptive direct link channel switch engine 588 of the WLAN module 580 of FIG. 5 implemented as a processor executing instructions to, in response to detecting the instruction and the indication, generate a channel switch instruction message, indicate the second device as a recipient of the message, include an indication of the second channel in the message, and initiate sending of the message via the transceiver 582. In a particular embodiment, generating the message may include encapsulating the channel switch instruction message within a data frame for transfer via a direct link in accordance with a tunneling direct link setup (TDLS) procedure of an IEEE 802.11 specification.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g. a mobile phone). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
receiving, at a first device within a basic services set (BSS), the BSS including an access point device, wherein the first device communicates with a second device over a first channel, an instruction to cease communicating over the first channel and an indication of a second channel, wherein the instruction and the indication correspond to an access point-initiated channel switch to switch the BSS from the first channel to the second channel due to detection of an interference signal on the first channel that satisfies a radar signal detection criterion;
determining whether the second device is within the BSS; and
in response to determining that the second device is within the BSS, establishing, by the first device, a direct link with the second device to enable communication between the first device and the second device bypassing the access point device using the second channel, wherein establishing the direct link enables a quality of service criterion for data exchange between the first device and the second device to be satisfied by avoiding a non-communication period on the first channel prior to completion of the access point-initiated channel switch.

2. The method of claim 1, wherein the radar signal detection criterion includes a received signal strength that exceeds a radar signal interference threshold.

3. The method of claim 1, wherein determining whether the second device is within the BSS is performed according to a direct link setup (DLS)-based discovery procedure or according to a tunneling-direct link setup (TDLS)-based discovery procedure, 4. The method of claim 1, further comprising monitoring beacons received from the access point device to determine a switch of the access point device to the second channel.

5. The method of claim 4, further comprising sending data to the second device via the access point device after the access point device switches to the second channel.

6. The method of claim 1, further comprising:
sending a request to the access point device prior to receiving the indication of the second channel; and
receiving a response to the request from the access point device, wherein the response includes the indication of the second channel.

7. The method of claim 6, wherein the request includes a probe request, wherein the response includes a probe response that includes a channel switch announcement, and wherein the instruction corresponds to a channel switch mode indicator in the channel switch announcement.

8. The method of claim 6, further comprising:
detecting, by the first device, the interference signal on the first channel; and
sending the request in response to detecting that the interference signal satisfies the radar signal detection criterion.

9. The method of claim 8, wherein establishing the direct link with the second device using the second channel includes sending a channel switch instruction to the second device via a first direct link using the first channel, and wherein the direct link is established using the second channel prior to the access point device switching to the second channel.

10. The method of claim 9, wherein the channel switch instruction is sent according to a tunneling direct link setup (TDLS) procedure.

11. The method of claim 9, further comprising establishing the first direct link with the second device in response to detecting that the interference signal satisfies the radar signal detection criterion.

12. The method of claim 9, wherein the first direct link with the second device is established prior to detecting the interference signal.

13. A semiconductor device comprising:
a direct link channel switch engine configured to:
in response to an instruction to cease communicating over a first channel and an indication of a second channel having been received from an access point device of a basic services set (BSS) and after a direct link with another device using the first channel has been established, determine whether the other device is within the BSS, wherein the direct link with the other device enables communication with the other device and bypassing of the access point device, wherein the instruction and the indication correspond to an access point-initiated channel switch to switch the BSS from the first channel to the second channel due to detection of an interference signal on the first channel that satisfies a radar signal detection criterion; and
in response to determining that the other device is within the BSS, request switching of the direct link from the first channel to the second channel to enable communication with the other device using the second channel, wherein switching of the direct link to the second channel enables a quality of service criterion for data exchange with the other device to be satisfied by avoiding a non-communication period on the first channel prior to completion of the access point-initiated channel switch.

14. The semiconductor device of claim 13, wherein the direct link channel switch engine is in a media access controller.

15. The semiconductor device of claim 14, further comprising a wireless transceiver, wherein the wireless transceiver is coupled to the media access controller.

16. The semiconductor device of claim 15, further comprising a processing unit coupled to the media access controller and a coder/decoder (codec) coupled to the processing unit.

17. A device comprising:
an antenna coupled to a transceiver; and
a direct link channel switch engine configured to:
in response to an instruction to cease communicating over a first channel and an indication of a second channel having been received from an access point device of a basic services set (BSS) and after a direct link with another device using the first channel has been established, determine whether the other device is within the BSS, wherein the direct link with the other device enables communication with the other device and bypassing of the access point device, wherein the instruction and the indication correspond to an access point-initiated channel switch to switch the BSS from the first channel to the second channel due to detection of an interference signal on the first channel that satisfies a radar signal detection criterion; and
in response to determining that the other device is within the BSS, request switching of the direct link from the first channel to the second channel to enable communication with the other device using the second channel, wherein switching of the direct link to the second channel enables a quality of service criterion for data exchange with the other device to be satisfied by avoiding a non-communication period on the first channel prior to completion of the access point-initiated channel switch.

18. The device of claim 17, further comprising a processing unit coupled to the transceiver and to the direct link channel switch engine.

19. The device of claim 18, further comprising a camera and a microphone coupled to the processing unit.

20. A non-transitory computer readable medium comprising instructions that, when executed by a processor, cause the processor to:
receive an instruction to cease communicating over a first channel and an indication of a second channel, wherein the instruction and the indication are received from an access point device of a basic services set (BSS) and correspond to an access point-initiated channel switch to switch the BSS from the first channel to the second channel due to detection of an interference signal on the first channel that satisfies a radar signal detection criterion;
determine whether another device is within the BSS, wherein communication with the other device is over the first channel; and
in response to determining that the other device is within the BSS, establish a direct link with the other device using the second channel to enable communication with the other device that bypasses the access point device using the second channel, wherein establishing the direct link enables a quality of service criterion for data exchange with the other device to be satisfied by avoiding a non-communication period on the first channel prior to completion of the access point-initiated channel switch.

21. The non-transitory computer readable medium of claim 20, further comprising instructions executable to cause the processor to:
detect the interference signal on the first channel; and
send a request in response to detecting that the interference signal satisfies the radar signal detection criterion.

22. The non-transitory computer readable medium of claim 20, further comprising instructions executable to cause the processor to generate a channel switch instruction to be sent to the other device via a first direct link using the first channel to establish the direct link with the other device using the second channel, and wherein the direct link is established using the second channel prior to the access point device switching to the second channel.

23. The non-transitory computer readable medium of claim 22, wherein the channel switch instruction is sent according to a tunneling direct link setup (TDLS) procedure.

24. An apparatus comprising:
means for receiving an instruction to cease communicating over a first channel and an indication of a second channel, wherein communication with another device is over the first channel and wherein the instruction and the indication are received from an access point device of a basic services set (BSS) and correspond to an access point-initiated channel switch to switch the BSS from the first channel to the second channel due to detection of an interference signal on the first channel that satisfies a radar signal detection criterion; and
means for establishing a direct link with the other device using the second channel to enable communication with the other device that bypasses the access point device using the second channel in response to determining that the other device is within the BSS, wherein establishing the direct link enables a quality of service criterion for data exchange with the other device to be satisfied by avoiding a non-communication period on the first channel prior to completion of the access point-initiated channel switch.

25. The apparatus of claim 24, further comprising means for sending a request to the access point device prior to receiving the indication of the second channel and for receiving a response from the access point device, wherein the response includes the indication of the second channel.

26. The apparatus of claim 25, wherein the request includes a probe request, wherein the response includes a probe response that includes a channel switch announcement and wherein the instruction corresponds to a channel switch mode indicator in the channel switch announcement.

27. The apparatus of claim 24, further comprising:
means for detecting the interference signal on the first channel; and
means for detecting whether the interference signal satisfies the radar signal detection criterion, wherein a request is sent in response to detecting that the interference signal satisfies the radar signal detection criterion.

28. A method comprising:
sending, by an access point device of a basic services set (BSS), an instruction to cease communicating over a first channel and an indication of a second channel, wherein the instruction and the indication correspond to an access point-initiated channel switch to switch the BSS from the first channel to the second channel due to detection of an interference signal on the first channel that satisfies a radar signal detection criterion;
receiving, by a first device within the BSS, the instruction and the indication, wherein the first device communicates with a second device over the first channel;
determining whether the second device is within the BSS; and
in response to a determination that the second device is within the BSS, establishing, by the first device, a direct link with the second device using the second channel to enable communication between the first device and the second device bypassing the access point device using the second channel, wherein establishing the direct link using the second channel enables a quality of service criterion for data exchange between the first device and the second device to be satisfied by avoiding a non-communication period on the first channel prior to completion of the access point-initiated channel switch.

29. The method of claim 28, further comprising:
sending, by the first device, a request to the access point device prior to the first device receiving the indication of the second channel; and
sending, by the access point device, a response to the request, wherein the response includes the indication of the second channel.

30. The method of claim 29, wherein the request includes a probe request, wherein the response includes a probe response that includes a channel switch announcement, and wherein the instruction corresponds to a channel switch mode indicator in the channel switch announcement.

31. The method of claim 30, further comprising:
detecting, by the first device, the interference signal on the first channel; and
sending the request in response to detecting, at the first device, that the interference signal satisfies the radar signal detection criterion.

32. A system comprising:
an access point device of a basic services set (BSS), the access point device configured to send an instruction to cease communicating over a first channel and an indication of a second channel, wherein the instruction and the indication correspond to an access point-initiated channel switch to switch the BSS from the first channel to the second channel due to detection of an interference signal on the first channel that satisfies a radar signal detection criterion; and
a first device within the BSS configured to communicate with a second device over the first channel and, in response to receiving the instruction and the indication and determining that the second device is within the BSS, to establish a direct link with the second device using the second channel to enable communication between the first device and the second device that bypasses the access point device using the second channel, wherein establishing the direct link using the second channel enables a quality of service criterion for data exchange between the first device and the second device to be satisfied by avoiding a non-communication period on the first channel prior to completion of the access point-initiated channel switch.

33. A method comprising:
receiving an instruction to cease transmission of frames over a first channel and receiving an indication of a second channel, the instruction and the indication received at a first device from an access point device via a wireless network, wherein the instruction and the indication correspond to an access point-initiated channel switch to switch network communications from the first channel to the second channel; and
establishing, by the first device, a direct link with a second device using the second channel to enable communication between the first device and the second device that bypasses the access point device using the second channel, wherein establishing the direct link enables a quality of service criterion for data exchange between the first device and the second device to be satisfied by avoiding a non-communication period on the first channel prior to completion of the access point-initiated channel switch.

34. The method of claim 33, wherein the indication of the second channel and the instruction to cease transmission of frames correspond to a detection of an interference signal on the first channel having a received signal strength that exceeds a radar signal interference threshold.

35. A semiconductor device comprising:
a direct link channel switch engine configured to request switching of a direct link with another device from a first channel to a second channel after an instruction to cease transmission of frames over the first channel has been received and after an indication of the second channel has been received via a wireless network, wherein the instruction and the indication correspond to an access point-initiated channel switch to switch network communications from the first channel to the second channel, and wherein switching the direct link enables communication with the other device that bypasses an access point device using the second channel, and enables a quality of service criterion for data exchange between the semiconductor device and the other device to be satisfied by avoiding a non-communication period on the first channel prior to completion of the access point-initiated channel switch.

36. The semiconductor device of claim 35, wherein the direct link channel switch engine is in a media access controller.

37. The semiconductor device of claim 36, further comprising a wireless transceiver, wherein the wireless transceiver is coupled to the media access controller.

* * * * *